(12) United States Patent
Hisada et al.

(10) Patent No.: US 10,076,807 B2
(45) Date of Patent: Sep. 18, 2018

(54) WELDING METHOD

(71) Applicant: TOYOTA JIDOSHA KABUSHIKI KAISHA, Toyota-shi, Aichi-ken (JP)

(72) Inventors: Kohei Hisada, Nagoya (JP); Toru Hioki, Miyoshi (JP); Kazuyuki Ogusu, Okazaki (JP); Shuichi Matsumoto, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 440 days.

(21) Appl. No.: 15/060,679

(22) Filed: Mar. 4, 2016

(65) Prior Publication Data

US 2016/0288262 A1    Oct. 6, 2016

(30) Foreign Application Priority Data

Apr. 3, 2015  (JP) ................. 2015-076492
Apr. 3, 2015  (JP) ................. 2015-076493

(51) Int. Cl.
  *B23K 26/22* (2006.01)
  *B23K 15/00* (2006.01)

(52) U.S. Cl.
  CPC ............ *B23K 26/22* (2013.01); *B23K 15/008* (2013.01)

(58) Field of Classification Search
  CPC ................................. B23K 26/22; B23K 15/00
  USPC .................................................... 219/121.64
  See application file for complete search history.

(56) References Cited

U.S. PATENT DOCUMENTS

| 6,461,149 B1* | 10/2002 | Ahmady ............... F23D 14/145 |
|---|---|---|
|  |  | 431/326 |
| 2007/0175867 A1* | 8/2007 | Wang .................... B23K 11/004 |
|  |  | 219/86.9 |
| 2014/0377578 A1 | 12/2014 | Hisada et al. |
| 2015/0298255 A1 | 10/2015 | Hisada et al. |

FOREIGN PATENT DOCUMENTS

| CN | 104023900 A |   | 9/2014 |  |
|---|---|---|---|---|
| JP | 58188582 A | * | 4/1983 | ............. B23K 10/11 |
| JP | H08-306813 A |   | 11/1996 |  |
| JP | H11-320153 A |   | 11/1999 |  |
| JP | 2001-062575 A |   | 3/2001 |  |
| JP | 2003-138935 A |   | 5/2003 |  |
| JP | 2004-306113 A |   | 11/2004 |  |
| JP | 2006-096276 A |   | 4/2006 |  |
| JP | 2009-241116 A |   | 10/2009 |  |
| JP | 2010-264503 A |   | 11/2010 |  |
| JP | 2013-132686 A |   | 7/2013 |  |
| JP | 2014-057986 A |   | 4/2014 |  |
| JP | 2014-161869 A |   | 9/2014 |  |
| JP | 2015-205323 A |   | 11/2015 |  |
| JP | 2016-196015 A |   | 11/2016 |  |
| JP | 2016-196016 A |   | 11/2016 |  |

* cited by examiner

*Primary Examiner* — Samuel M Heinrich
(74) *Attorney, Agent, or Firm* — Oliff PLC

(57) ABSTRACT

A welding method according to the invention is a welding method in which welding is performed by emitting a high-energy beam onto a welding object that includes a plurality of overlapped metal sheets. This welding method includes forming a tack weld nugget at a welding point on the welding object, and forming a plurality of final weld nuggets along a virtual closed curve that encircles the tack weld nugget, while leaving the tack weld nugget, at the welding point.

14 Claims, 12 Drawing Sheets

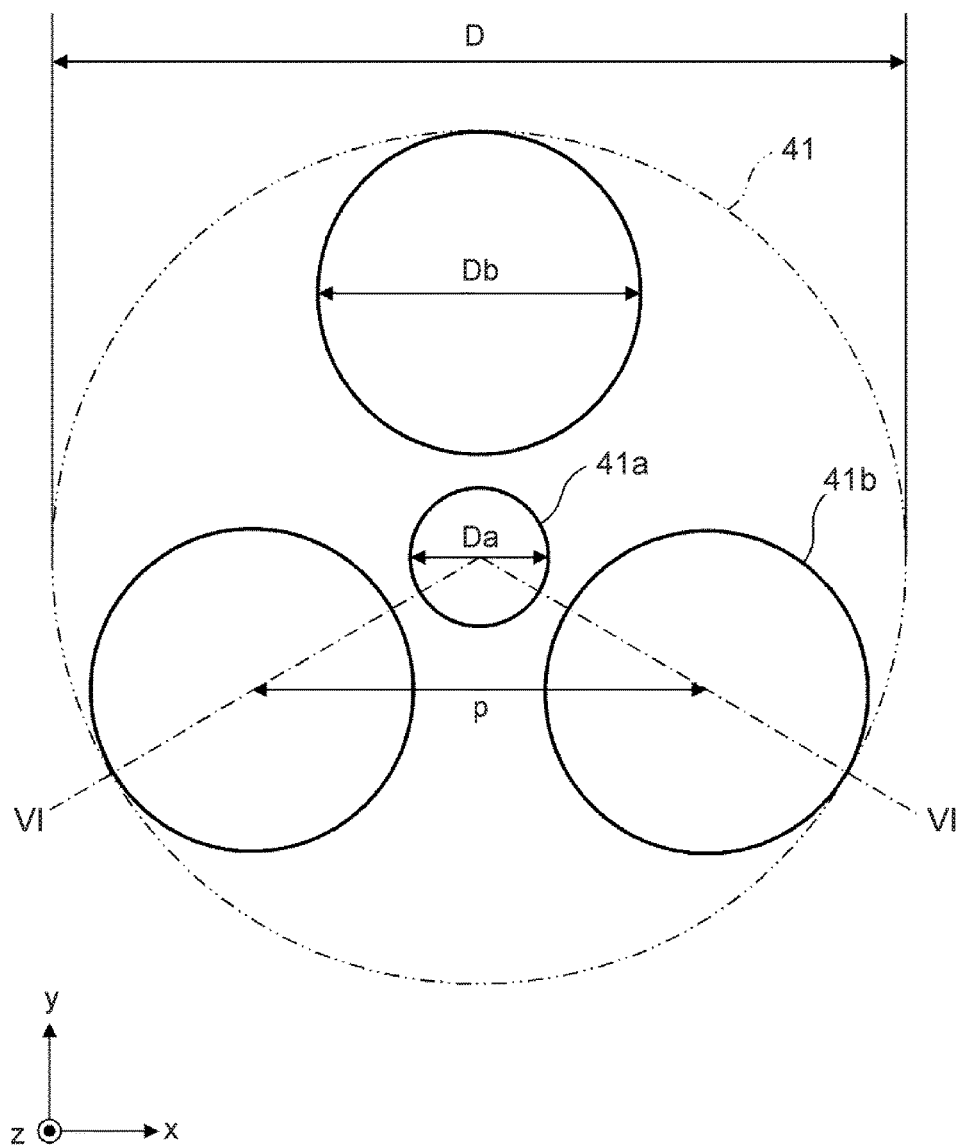

WELDING METHOD

INCORPORATION BY REFERENCE

The disclosure of Japanese Patent Application No. 2015-076492 and 2015-76493 filed on Apr. 3, 2015 including the specification, drawings and abstract is incorporated herein by reference in its entirety.

BACKGROUND OF THE INVENTION

1. Field of the Invention

The invention relates to a welding method. More particularly, the invention relates to a welding method using a high-energy beam such as a laser beam, an electron beam, or an ion beam.

2. Description of Related Art

As one welding method to join a plurality of overlapped metal sheets together, a welding method by laser welding is widely used because it offers the advantages several advantages, for example, there is little processing stress, high-speed welding is possible, and few portions are affected by residual heat.

Japanese Patent Application Publication No. 2013-132686 (JP 2013-132686 A) by the inventors describes a laser welding method that forms a plurality of nuggets at a constant pitch p, on a virtual closed curve formed by a circle, for example. A strength equal to or greater than that of a circular or round weld having approximately the same diameter dimension as the closed curve is realized by appropriately specifying the pitch p and diameter d.

With the technology described in JP 2013-132686 A, when the diameter of the nuggets becomes relatively large, for example, deformation due to residual stress or thermal deformation during welding may occur. One known way to inhibit such deformation during welding is to first perform tack welding, and then perform final welding on or near the tack weld.

However, when final welding is performed on top of a tack weld, the deformation inhibiting effect by the tack weld is lost when the final welding is performed, and as a result, deformation may end up occurring after all. On the other hand, if final welding is performed near the tack weld and the tack weld is left even after final welding, the weak tack weld may peel after the final welding is performed. Although peeling of the tack weld does not pose a problem in terms of strength, an abnormal noise may be produced when the tack weld peels.

With a welding method described in Japanese Patent Application Publication No. 2009-241116 (JP 2009-241116 A), a continuous weld is formed by first spot welding overlapped metal material along a predetermined joint line, and then laser welding along the spot weld. JP 2009-241116 A notes that spot welding obviates the need for a jig or temporary fixing for momentarily holding when performing laser welding. That is, a spot weld also serves as a tack weld to inhibit deformation of an object to be welded at the time of laser welding.

With the technology described in JP 2009-241116 A, the spot weld corresponding to the tack weld protrudes from the continuous weld by laser welding that corresponds to the final weld. Here, with a highly conductive aluminum alloy sheet or the like, for example, the tack weld is weaker than the final weld. Therefore, when the tack weld protrudes from the final weld as described in JP 2009-241116 A, the weak tack weld may peel for some reason after final welding is performed. Although peeling of the tack weld does not pose a problem in terms of strength, an abnormal noise may be produced when the tack weld peels.

SUMMARY OF THE INVENTION

A first aspect of the invention both inhibits deformation of a welding object when final welding is performed, and inhibits peeling of a tack weld after the final welding.

The first aspect of the invention relates to a welding method in which welding is performed by emitting a high-energy beam onto a welding object that includes a plurality of overlapped metal sheets. This welding method includes forming a tack weld nugget at a welding point on the welding object, and forming a plurality of final weld nuggets along a virtual closed curve that encircles the tack weld nugget, while leaving the tack weld nugget, at the welding point.

In the welding method according to the first aspect of the invention, a plurality of final weld nuggets are formed along a virtual closed curve that encircles the tack weld nugget, while leaving the tack weld nugget, at the welding point. That is, because the tack weld nugget is left, the deformation inhibiting effect by the tack weld nugget is able to be maintained even during final welding. Also, because the tack weld nugget that has been left is surrounded by the final weld nuggets, peeling of the tack weld nugget after final welding is able to be inhibited. That is, both deformation of the welding objects during final welding, and peeling of the tack weld after final welding, are able to be inhibited.

A second aspect of the invention also inhibits peeling of the tack weld after final welding.

The second aspect of the invention relates to a welding method in which welding is performed by emitting a high-energy beam onto a welding object that includes a plurality of overlapped metal sheets. This welding method includes forming a tack weld nugget at a welding point on the welding object by spot welding, and forming a plurality of final weld nuggets by emitting the high-energy beam along a virtual closed curve that encircles the tack weld nugget, while leaving the tack weld nugget, at the welding point.

In the welding method according to the second aspect of the invention, a plurality of final weld nuggets are formed by emitting a high-energy beam along a virtual closed curve that encircles the tack weld nugget, while leaving the tack weld nugget formed by spot welding, at the welding point. Therefore, the tack weld nugget is surrounded by the final weld nuggets, so peeling of the tack weld nugget after final welding is able to be inhibited.

In the welding methods according to the first and second aspects of the invention, a size of the tack weld nugget may be made smaller than a size of each of the plurality of final weld nuggets. As a result, thermal deformation when forming the tack weld nugget is able to be reduced.

Moreover, in the welding methods according to the first and second aspects of the invention, the tack weld nugget and the plurality of final weld nuggets may be formed separated from each other. As a result, deformation of the welding object at the time of final welding is able to be more effectively inhibited.

Also, in the welding methods according to the first and second aspects of the invention, a laser beam may be used as the high-energy beam.

Also, in the welding methods according to the first and second aspects of the invention, the virtual closed curve may correspond to a circumscribed circle of the final weld nuggets.

Also, in the welding methods according to the first and second aspects of the invention, the virtual closed curve may correspond to the welding point.

Also, in the welding methods according to the first and second aspects of the invention, the tack weld nugget and the final weld nugget may have a circular shape, and the size of the tack weld nugget may be a diameter of the tack weld nugget, and the size of the final weld nugget may be a diameter of the final weld nugget.

Also, in the welding methods according to the first and second aspects of the invention, the tack weld nugget and the final weld nugget may have an elliptical shape, and the size of the tack weld nugget may be a major axis length of the tack weld nugget, and the size of the final weld nugget may be a major axis length of the final weld nugget.

Also, in the welding methods according to the first and second aspects of the invention, the tack weld nugget and the final weld nugget may have an elliptical shape, and the size of the tack weld nugget may be an average value of a major axis length of the tack weld nugget and a minor axis length of the tack weld nugget, and the size of the final weld nugget may be an average value of a major axis length of the final weld nugget and a minor axis length of the final weld nugget.

According to the first aspect of the invention, both deformation of a welding object when final welding is performed, and peeling of a tack weld after the final welding, are able to be inhibited.

According to the second aspect of the invention, peeling of the tack weld after final welding is able to be inhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is an enlarged plan view of a welding point;

DETAILED DESCRIPTION OF EMBODIMENTS

Hereinafter, specific example embodiments to which the invention has been applied will be described in detail with reference to the accompanying drawings. However, the invention is not limited to these example embodiments. Also, the description and the drawings are simplified as appropriate for clarity.

First Example Embodiment

Figure 1:
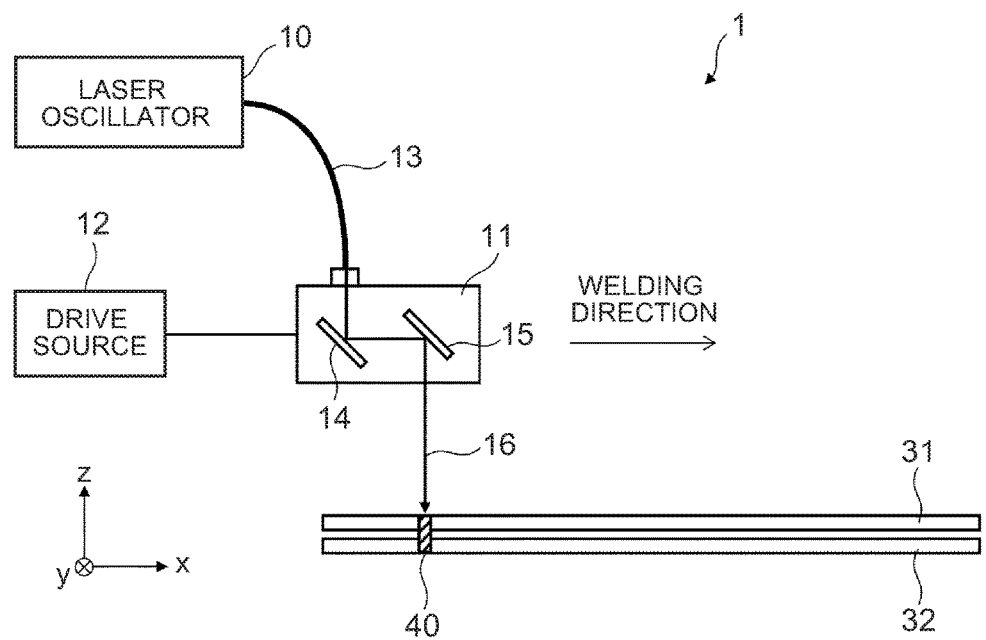
FIG. 1 is a side view of one example of a laser welding apparatus for carrying out a welding method according to a first example embodiment of the invention.
Figure 2:
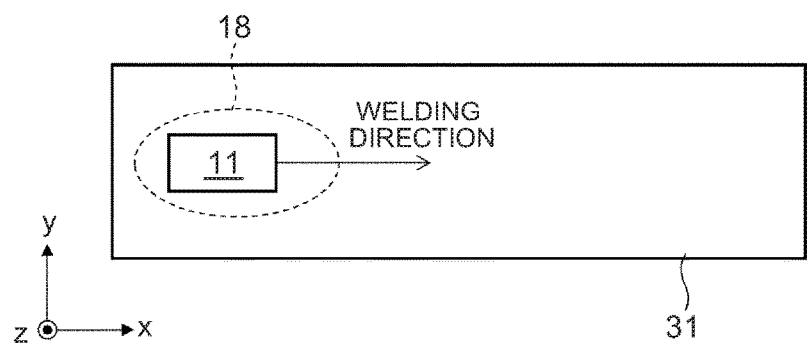
FIG. 2 is a plan view illustrating the basic operation of the laser welding apparatus.

First, a laser welding apparatus for carrying out a welding method according to a first example embodiment of the invention will be described with reference to FIGS. 1 to 3. FIG. 1 is a side view of one example of the laser welding apparatus for carrying out a welding method according to the first example embodiment. FIG. 2 is a plan view illustrating the basic operation of the laser welding apparatus. FIG. 3 is a sectional view illustrating the basic operation of the laser welding apparatus.

The right-handed xyz coordinate systems shown in FIGS. 1 to 3 and other drawings are for descriptive purposes in order to illustrate the positional relationship of the constituent elements, and correspond to each other in the drawings. Normally, the xy plane is a horizontal plane, and the z-axis plus direction is the vertically upward direction.

As shown in FIG. 1, a laser welding apparatus 1 includes a laser oscillator 10, a scanning portion 11, and a drive source 12. The laser oscillator 10 generates a laser beam. The generated laser beam is led to the scanning portion 11 using a fiber-optic cable 13. A carbon dioxide laser, a YAG laser, or a fiber laser, for example, may be used as the laser beam.

The scanning portion 11 provides a laser beam 16 led via the fiber-optic cable 13 from the laser oscillator 10 in a providing area 18 shown in FIG. 2, and emits the laser beam 16 onto a metal sheet 31 that is a welding object. As a result, a welding point 40 that extends between the two overlapped metal sheets 31 and 32 is formed.

The scanning portion 11 includes mirrors 14 and 15 that are each able to pivot about a single pivot axis. For example, the mirror 14 provides the laser beam 16 in the x-axis direction, and the mirror 15 scans the laser beam 16 in the y-axis direction. The mirrors 14 and 15 may be formed using galvanometer mirrors, for example.

The scanning portion 11 is able to move in an appropriate direction (the x-axis direction, y-axis direction, and z-axis direction) by the drive source 12 such as a robot, for example. In FIG. 1, the scanning portion 11 is formed from the two mirrors 14 and 15, but the scanning portion 11 may also be formed from a single mirror that is able to pivot in two axial directions.

Next, the basic operation of the laser welding apparatus 1 will be described with reference to FIGS. 2 and 3. FIGS. 2 and 3 are views illustrating a case in which two metal sheets 31 and 32 as welding objects are joined together by welding. FIG. 3 is a view illustrating a case in which the two metal sheets 31 and 32 that are welding objects are arranged slightly apart, but the two metal sheets 31 and 32 may also be arranged contacting each other.

As shown in the plan view of FIG. 2, when welding the metal sheets 31 and 32, the scanning portion 11 moves in a welding direction shown by the arrow. Here, the welding direction is the direction in which the metal sheets 31 and 32 are welded. In other words, the welding direction is the direction in which welding points 41 and 42 shown in FIG. 3 are formed. At this time, the providing area 18 of the laser beam 16 moves as the scanning portion 11 moves. The scanning portion 11 may move at a constant speed (i.e., continuously) in the welding direction, or may move in a stepped manner (i.e., non-continuously).

Figure 3A:
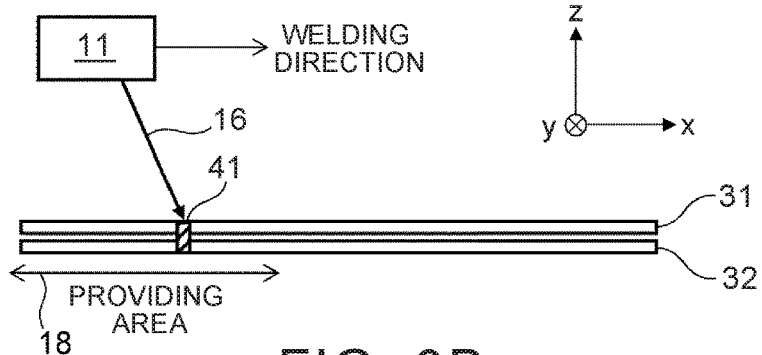
FIG. 3A is a sectional view illustrating the basic operation of the laser welding apparatus.
Figure 3B:
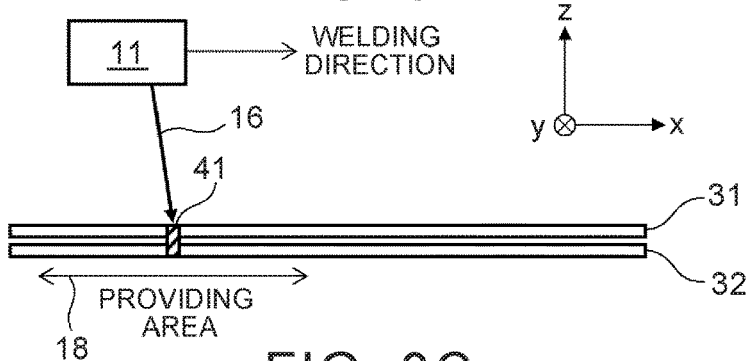
FIG. 3B is a sectional view illustrating the basic operation of the laser welding apparatus.
Figure 3C:
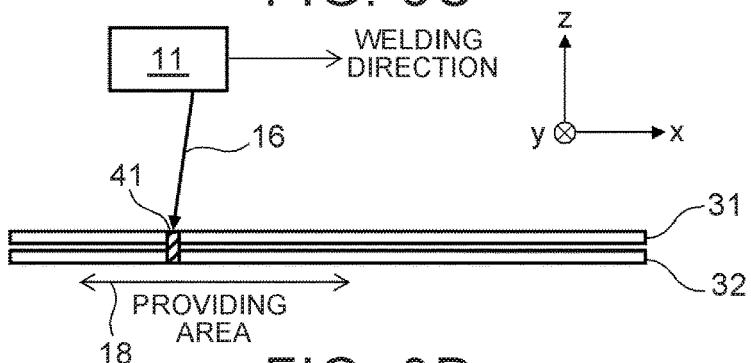
FIG. 3C is a sectional view illustrating the basic operation of the laser welding apparatus.

Also, as shown in FIG. 3A, when welding the metal sheets 31 and 32, the scanning portion 11 emits the laser beam 16 at the welding point 41. The scanning portion 11 continues to move in the welding direction. Therefore, the scanning portion 11 provides the laser beam 16 such that the laser beam 16 is emitted at the welding point 41, as shown in FIGS. 3B and 3C. The moving speed of the scanning portion 11 is set to a speed such that the welding point 41 falls within the providing area 18 of the scanning portion 11 from start to finish of the welding of the welding point 41.

Figure 3D:
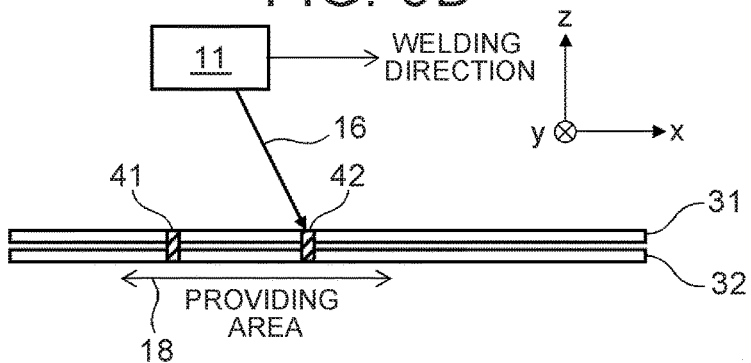
FIG. 3D is a sectional view illustrating the basic operation of the laser welding apparatus.

Then, the scanning portion 11 emits the laser beam 16 at the next welding point 42, as shown in FIG. 3D. In this way, the laser welding apparatus 1 is able to provide the laser beam 16 with the scanning portion 11 and weld a predetermined point of the metal sheets 31 and 32, while moving the scanning portion 11 with the drive source 12. When the welding method described above is used, the welding points 41 (the welding point 40 in FIG. 1) are discrete. Naturally, the number of the plurality of metal sheets that are the welding objects may also be three or more.

Next, the welding method according to this example embodiment will be described with reference to FIG. 4. FIG. 4 is a view illustrating the welding method according to the first example embodiment. The welding method according to this example embodiment may be carried out using the laser welding apparatus 1 described above. FIGS. 4A to 4D are plan views of the metal sheet 31 onto which the laser beam 16 is emitted. In FIG. 4, only the providing area 18 of the scanning portion 11 is shown; the scanning portion 11 is not shown.

The welding method according to this example embodiment is a laser welding method that performs welding the plurality of metal sheets 31 and 32 together by emitting the laser beam 16 provided by the scanning portion 11 onto the plurality of metal sheets 31 and 32 that are the welding objects, while moving the scanning portion 11 that provides the laser beam 16 led from the laser oscillator 10.

Figure 4A:
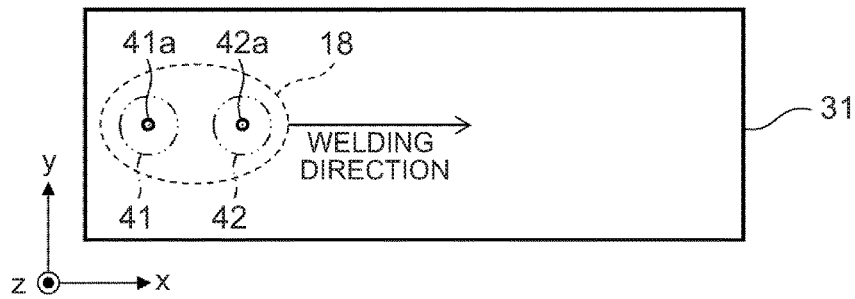
FIG. 4A is a view illustrating the welding method according to the first example embodiment.

As shown in FIG. 4A, tack welding is performed by emitting the laser beam 16 at the welding point 41. More specifically, a tack weld nugget 41a is formed at the welding point 41. Then, tack welding is performed by emitting the laser beam 16 at the welding point 42. That is, a tack weld nugget 42a is formed at the welding point 42. Here, the tack weld is a temporary weld for inhibiting the metal sheets 31 and 32 from deforming due to residual stress and thermal deformation during final welding. The tack weld has less joint strength than the final weld.

Figure 4B:
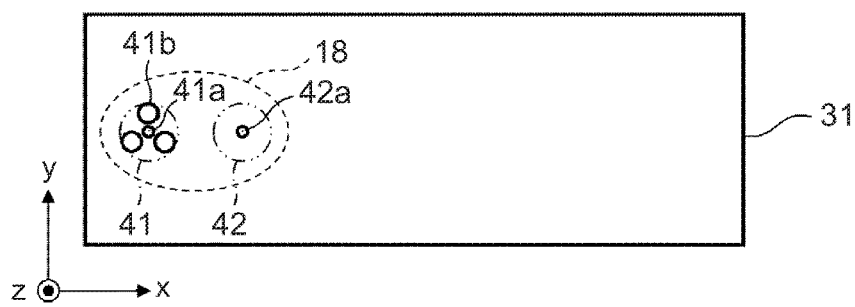
FIG. 4B is a view illustrating the welding method according to the first example embodiment.

Next, final welding is performed by emitting the laser beam 16 at the welding point 41, as shown in FIG. 4B. More specifically, a plurality of final weld nuggets 41b are formed surrounding the tack weld nugget 41a. In the example in the drawing, three final weld nuggets 41b are formed surrounding the tack weld nugget 41a. Here, final welding is welding for strongly joining the metal sheets 31 and 32 together. For example, the emission time of the laser beam 16 in the final welding is longer than the emission time of the laser beam 16 in tack welding. The specific structure of the welding point 41 including the tack weld nugget 41a and the plurality of final weld nuggets 41b will be described later.

Figure 4C:
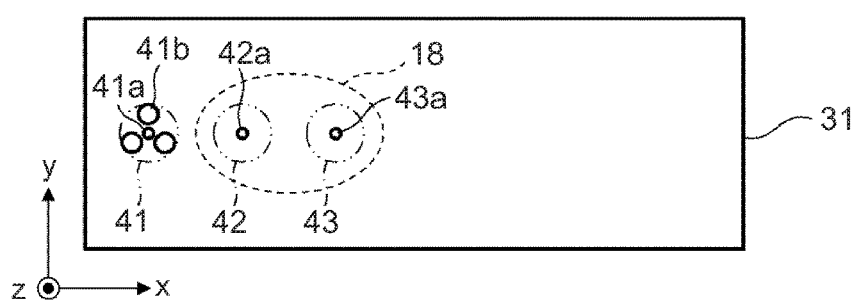
FIG. 4C is a view illustrating the welding method according to the first example embodiment.
Figure 4D:
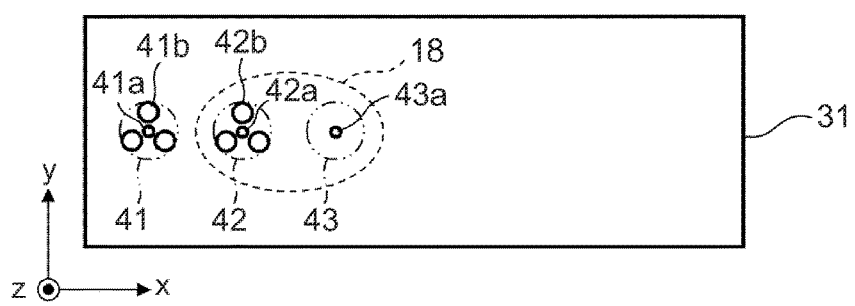
FIG. 4D is a view illustrating the welding method according to the first example embodiment.

Next, tack welding is performed by emitting the laser beam 16 at a welding point 43, as shown in FIG. 4C. That is, a tack weld nugget 43a is formed at the welding point 43. Then, the scanning portion 11 performs final welding by emitting the laser beam 16 at the welding point 42. That is, a plurality of final weld nuggets 42b are formed surrounding the tack weld nugget 42a. After this, the metal sheets 31 and 32 are able to be welded together by repeating this operation.

Figure 6:
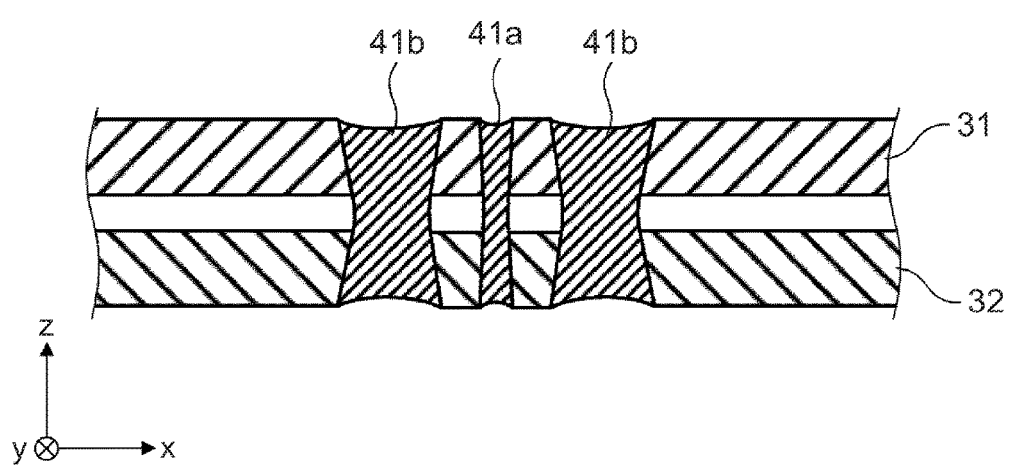
FIG. 6 is a sectional view taken along line VI-VI in FIG. 5.

Here, the specific structure of the welding point 41 including the tack weld nugget 41a and the plurality of final weld nuggets 41b will be described with reference to FIGS. 5 and 6. FIG. 5 is an enlarged plan view of the welding point 41. Also, FIG. 6 is a sectional view taken along line VI-VI in FIG. 5.

As shown in FIG. 5, with the welding method according to this example embodiment, the tack weld nugget 41a is first formed inside of a virtual closed curve shown by an alternate long and two short dashes line indicative of the welding point 41, and then the plurality of final weld nuggets 41b are formed along the virtual closed curve encircling the tack weld nugget 41a, while leaving the tack weld nugget 41a. Accordingly, the tack weld nugget 41a left after final welding is surrounded by the final weld nuggets 41b formed along the virtual closed curve encircling the tack weld nugget 41a.

That is, because the tack weld nugget 41a is left, the deformation inhibiting effect by the tack weld nugget 41a is able to be maintained even during final welding. Also, because the tack weld nugget 41a that has been left is surrounded by the final weld nuggets 41b, peeling of the tack weld nugget 41a after final welding is able to be inhibited. Therefore, both deformation of the welding objects during final welding, and peeling of the tack weld after final welding, are able to be inhibited.

In the example in FIG. 5, a single circular tack weld nugget 41a having a diameter Da is formed in the center of a circular virtual curve (i.e., the welding point 41) having a diameter D. Three circular final weld nuggets 41b each having a diameter Db that are inscribed in the virtual curve (i.e., the welding point 41) are formed at equally-spaced intervals surrounding this tack weld nugget 41a.

From the viewpoint of the deformation inhibiting effect during final welding, the tack weld nugget 41a is preferably formed away from the final weld nuggets 41b, as shown in FIG. 5. However, a portion of the tack weld nugget 41a and a portion of the final weld nuggets 41b may also overlap with each other.

The number of tack weld nuggets 41a and the number of final weld nuggets 41b are any number. Also, the shapes of the tack weld nugget 41a and the final weld nuggets 41b are not limited to being circular, and may also be elliptical or polygonal, for example. Furthermore, the virtual closed curve that encircles the tack weld nugget 41a is not limited to being circular, and may also be ellipsoidal or a suitable curve or polygonal. Also, in the example shown in FIG. 5, the virtual closed curve that encircles the tack weld nugget 41a circumscribes the final weld nuggets 41b, but it may also pass through the center of the final weld nuggets 41b, or be inscribed in the final weld nuggets 41b.

As shown in FIG. 5, the size (e.g., diameter) Da of the tack weld nugget 41a is preferably smaller than the size (e.g., diameter) Db of each of the final weld nuggets 41b. This enables thermal deformation when forming the tack weld nugget 41a to be lessened. Also, a smaller size Da of the tack weld nugget 41a does result in a decreased deformation inhibiting effect at the time of final welding, but it also enables the tack welding time to be shortened, which improves production efficiency and energy efficiency.

In view of strength characteristics such as peeling strength, it is preferable to have the size Db of the final weld nuggets 41b with respect to the distance between adjacent final weld nuggets 41b, i.e., the pitch p, be so as to satisfy $1/2 < Db/p \le 1$. The size Db of the final weld nuggets 41b is the diameter when the final weld nuggets 41b have a circular shape. On the other hand, when the final weld nuggets 41b have an elliptical shape, the size Db may be the major axis length or it may be an average value of the major axis length and the minor axis length, for example.

When $Db/p \le 1/2$, the size Db of the final weld nuggets 41b with respect to the pitch p is small, so the final weld nuggets 41b are separated from each other. Therefore, the plurality of final weld nuggets 41b do not affect each other in terms of their strength characteristic, so when a load exceeding the strength of a single final weld nugget 41b is applied, the final weld nugget 41b will fracture individually. Therefore, the strength characteristic of each final weld nugget 41b is less than the strength characteristic of a single nugget that is surrounded by a virtual curve (i.e., the welding point 41) having the diameter D.

Also, when $1 < Db/p$, the size Db of the final weld nuggets 41b is too large for the pitch p, and adjacent final weld nuggets 41b, which have the size Db, overlap with each other. Therefore, the plurality of final weld nuggets 41b become a single nugget and fracture all at once along the boundary between the molten portion and the base material. That is, when $1 < Db/p$, the strength characteristic will be equivalent to strength characteristic of a single nugget that is surrounded by the virtual curve (i.e., the welding point 41) having the diameter D.

On the other hand, when $1/2 < Db/p \le 1$, adjacent final weld nuggets 41b are suitably separated from each other. That is, base material (i.e., the metal sheets 31 and 32) is in between adjacent final weld nuggets 41b, so the final weld nuggets 41b are inhibited from becoming a single nugget and fracturing. In addition, the final weld nuggets 41b are also inhibited from fracturing individually. Therefore, when $1/2 < Db/p \le 1$, a strength characteristic exceeding a strength characteristic of a single nugget that is surrounded by a virtual curve (i.e., the welding point 41) having the diameter D is able to be obtained.

Also, as shown in FIG. 4, when final welding a certain welding point, it is preferable to perform final welding while the welding points positioned on both sides thereof are restrained. More specifically, when final welding the welding point 42, for example, the welding point 43 that is positioned on the downstream side in the welding direction within the providing area 18 is preferably tack welded first, as shown in FIG. 4C. Final welding the welding points positioned on both sides while these welding points are restrained in this way makes it possible to more effectively inhibit deformation and positional deviation of the metal sheets 31 and 32 when the final welding is performed.

Also, as shown in FIG. 4, tack welding and final welding are preferably carried out within the providing area 18 while moving the scanning portion 11. As a result, the scanning portion 11 will pass through the welding route only once when welding the metal sheets 31 and 32, which improves productivity.

Alternatively, although productivity will not be as good, the scanning portion 11 may also pass through the welding route twice. That is, tack weld nuggets (i.e., the tack weld nugget 41a and 42a and the like) may first be formed at all of the welding points (i.e., the welding points 41 and 42 and the like), and then the final weld nuggets (i.e., the final weld nuggets 41b and 42b and the like) may then be formed.

As described above, with the welding method according to this example embodiment, after forming the tack weld nugget inside the virtual closed curve, the plurality of final weld nuggets are formed along the virtual closed curve that encircles the tack weld nugget, while leaving the tack weld nugget. Therefore, the tack weld nugget that is left after final welding is surrounded by the final weld nuggets formed along the virtual closed curve that encircles the tack weld nugget.

That is, because the tack weld nugget is left, the deformation inhibiting effect by the tack weld nugget is able to be maintained, even during final welding. Also, because the tack weld nugget that is left is surrounded by the final weld nuggets, peeling of the tack weld nugget after the final welding is able to be inhibited. Therefore, both deformation of the welding object during final welding, and peeling of the tack weld after final welding, are able to be inhibited.

Second Example Embodiment

Next, a welding method according to a second example embodiment of the invention will be described with reference to FIG. 7. In the first example embodiment, welding objects are welded together while performing tack welding at one location on the downstream side in the welding direction of a welding point where final welding is to be performed, as shown in FIG. 4. In contrast, in the second example embodiment, welding objects are welded together while performing tack welding at two locations on the downstream side in the welding direction of a welding point where final welding is to be performed, as shown in FIG. 7.

Figure 7A:
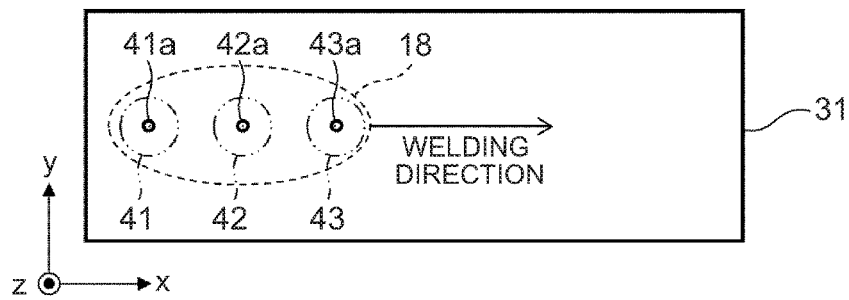
FIG. 7A is a view illustrating a welding method according to a second example embodiment of the invention.

As shown in FIG. 7A, tack welding is performed by emitting the laser beam 16 at each of the welding points 41, 42, and 43. That is, the tack weld nuggets 41a, 42a, and 43a are formed at the welding points 41, 42, and 43. The order in which the welding points 41, 42, and 43 are tack welded is not particularly limited and may be any order. However, when performing tack welding continuously, it is more efficient to perform tack welding in the order of 41, 42, and 43.

Figure 7B:
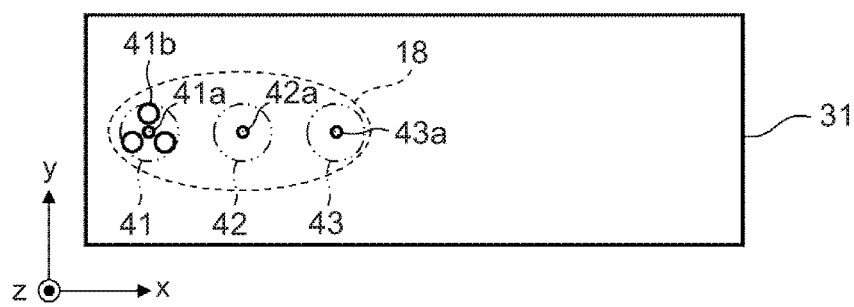
FIG. 7B is a view illustrating a welding method according to the second example embodiment.

Next, as shown in FIG. 7B, final welding is performed by emitting the laser beam 16 at the welding point 41. That is, a plurality of the final weld nuggets 41b are formed surrounding the tack weld nugget 41a.

Figure 7C:
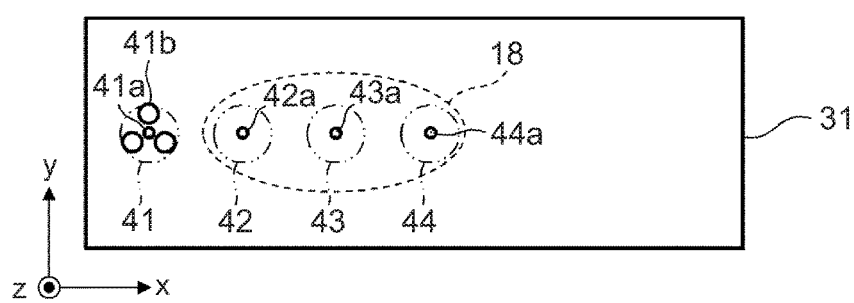
FIG. 7C is a view illustrating a welding method according to the second example embodiment.
Figure 7D:
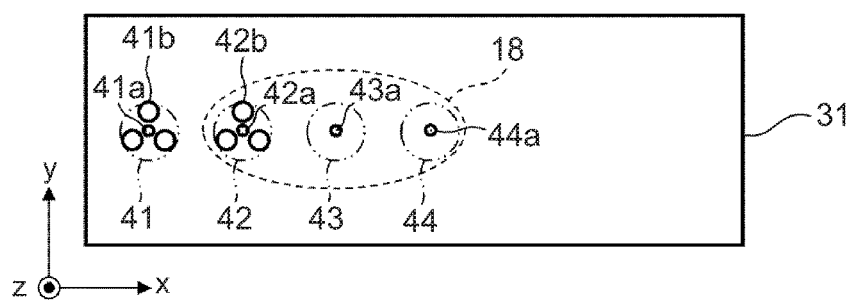
FIG. 7D is a view illustrating a welding method according to the second example embodiment.

Next, as shown in FIG. 7C, tack welding is performed by emitting the laser beam 16 at a welding point 44. That is, a tack weld nugget 44a is formed at the welding point 44. Then, as shown in FIG. 7D, final welding is performed by emitting the laser beam 16 at the welding point 42. That is, a plurality of the final weld nuggets 42b are formed surrounding the tack weld nugget 42a. After this, the metal sheets 31 and 32 are able to be welded together by repeating this operation.

With the welding method according to this example embodiment illustrated in FIG. 7, tack welding is performed at two locations on the downstream side in the welding direction of the location where final welding is to be performed. Therefore, deformation and positional deviation of the metal sheets 31 and 32 are able to be even more effectively inhibited than they are with the welding method according to the first example embodiment illustrated in FIG. 4. With the welding method according to this example embodiment, tack welding is performed at two locations on the downstream side of the location where final welding is to be performed, but tack welding may also be performed in two or more locations.

Figure 8:
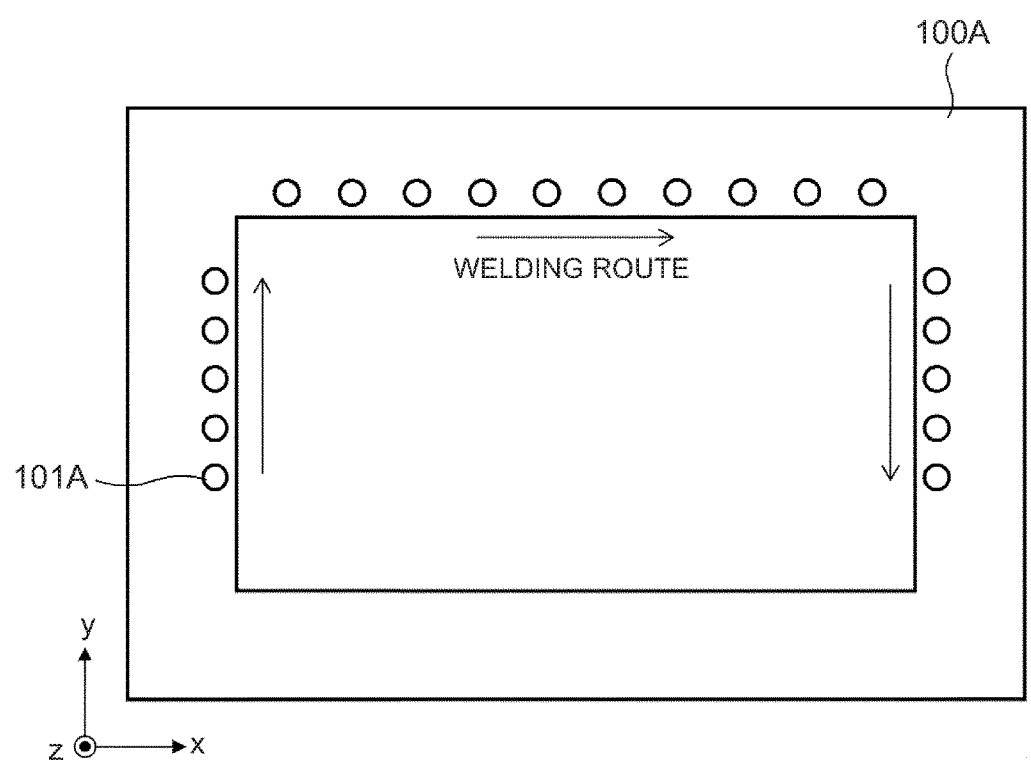
FIG. 8 is a plan view of a welding object according to the second example embodiment.

Next, an example of the invention will be described with reference to FIG. 8. FIG. 8 is a plan view of a welding object 100A according to the example. The welding object 100A was welded using the welding method according to the first example embodiment. In this example, the welding object 100A was made up of two overlapping frame-shaped 6000 series aluminum alloy sheets. The thickness of one aluminum alloy sheet was 1.2 mm and the thickness of the other aluminum alloy sheet was 0.9 mm A fiber laser was used for the laser oscillator 10 of the laser welding apparatus 1.

As shown in FIG. 8, there were 20 welding points 101A on the welding object 100A. At this time, tack welding and final welding of the welding object 100A are performed within the providing area 18 while moving the scanning portion 11, as is described with reference to FIG. 4. That is, in this example, the scanning portion 11 passed through the welding route indicated by the arrows in FIG. 8 when welding the welding object 100A.

Also, one circular tack weld nugget and three circular final weld nuggets were formed, as shown enlarged in FIG. 5, at each welding point 101A. The diameter Da of the tack weld nugget was approximately 1 mm. Also, the diameter Db of the final weld nuggets was approximately 5 mm The diameter D of the virtual closed curve, i.e., the circumscribed circle of the final weld nuggets, encircling the tack weld nugget was approximately 11 mm.

In this example, three of the final weld nuggets 41b are formed surrounding the one tack weld nugget, as shown in FIG. 5, at each welding point 101A. That is, because the tack weld nugget is left, the deformation inhibiting effect by the tack weld nugget is able to be maintained, even during final welding, so deformation of the welding objects during final welding is able to be inhibited. Also, because the tack weld nugget is surrounded by the final weld nuggets, peeling of the tack weld nugget after the final welding is able to be inhibited. That is, both deformation of the welding object during final welding, and peeling of the tack weld after final welding, are able to be inhibited.

The invention is not limited to the foregoing example embodiments. That is, appropriate modifications may be made within the scope of the invention. For example, the shape of the nuggets at the welding points is any shapage, i.e., the nuggets may be any appropriate shape, such as C-shaped, O-shaped, or linear, for example. Also, the welding method according to the invention may be broadly applied to welding that uses a high-energy beam such as a laser beam, an electron beam, or an ion beam (e.g., hybrid laser arc welding or electron beam welding). Furthermore, tack welding and final welding may be performed using a plurality of scanning portion. In this case, a plurality of laser beams are used, so the welding speed is able to be faster. Also, the welding method according to the invention is particularly suited to aluminum alloy sheet that tend to deform during welding, but it may also be applied to other metal sheet such as steel sheet.

Third Example Embodiment

Figure 9:
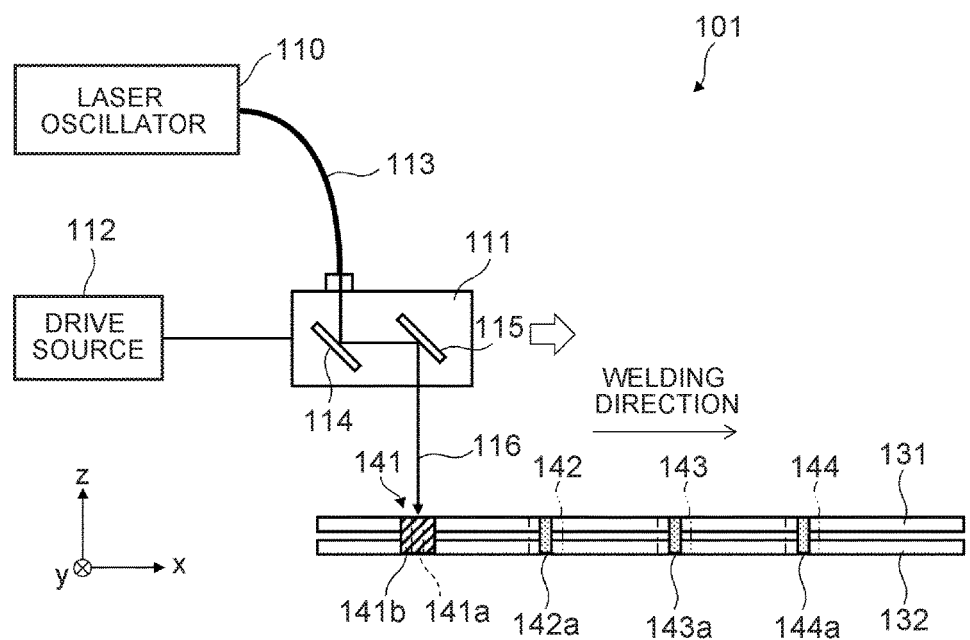
FIG. 9 is a side view of one example of a laser welding apparatus for carrying out a welding method according to a third example embodiment of the invention.
Figure 10:
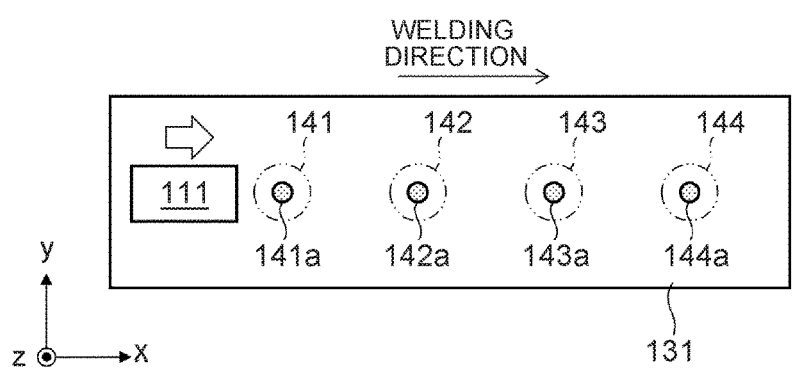
FIG. 10 is a plan view illustrating the basic operation of the laser welding apparatus.

First, a laser welding apparatus for carrying out the welding method according to a third example embodiment of the invention will be described with reference to FIGS. 9 and 10. FIG. 9 is a side view of one example of a laser welding apparatus for carrying out a welding method according to the third example embodiment. FIG. 10 is a plan view illustrating the basic operation of the laser welding apparatus.

The right-handed xyz coordinate systems shown in FIGS. 9 and 10 are for descriptive purposes in order to illustrate the positional relationship of the constituent elements, and correspond to each other in the drawings. Normally, the xy plane is a horizontal plane, and the z-axis plus direction is the vertically upward direction.

As shown in FIG. 9, a laser welding apparatus 101 includes a laser oscillator 110, a scanning portion 111, and a drive source 112. The laser oscillator 110 generates a laser beam. The generated laser beam is led to the scanning portion 111 using a fiber-optic cable 113. A carbon dioxide laser, a YAG laser, or a fiber laser, for example, may be used as the laser beam.

The scanning portion 111 provides a laser beam 116 led via the fiber-optic cable 113 from the laser oscillator 110, and emits the laser beam 116 at four welding points 141 to 144, in this order, on a metal sheet 131 that is a welding object. As a result, final weld nuggets that extend between the two overlapped metal sheets 131 and 132 are formed. As shown in FIGS. 9 and 10, tack weld nuggets 141a to 144a are formed by spot welding in advance at the welding points 141 to 144, respectively. FIG. 9 is a view showing the manner in which a final weld nugget 141b is formed by emitting the laser beam 116 at the welding point 141 where the tack weld nugget 141a is formed. The position and number of welding points is not particularly limited and may be determined appropriately.

The scanning portion 111 includes mirrors 114 and 115 that are each able to pivot about a single pivot axis. For example, the mirror 114 provides the laser beam 116 in the x-axis direction, and the mirror 115 provides the laser beam 116 in the y-axis direction. The mirrors 114 and 115 may be formed using galvanometer mirrors, for example. That is, the scanning portion 111 is able to provide the laser beam 116 over a predetermined providing area on the surface of the metal sheet 131.

Also, the scanning portion 111 is able to move in an appropriate direction (the x-axis direction, y-axis direction, and z-axis direction) by the drive source 112 such as a robot, for example. In FIG. 9, the scanning portion 111 is formed from the two mirrors 114 and 115, but the scanning portion 111 may also be formed from a single mirror that is able to pivot in two axial directions.

Next, the basic operation of the laser welding apparatus 101 will be described with reference to FIGS. 9 and 10. The example in the drawings illustrates a case in which the two metal sheets 131 and 132 that are welding objects are joined together by welding. FIG. 9 is a view illustrating a case in which the two metal sheets 131 and 132 that are welding objects are arranged slightly apart, but the two metal sheets 131 and 132 may also be arranged contacting each other.

As described above, the tack weld nuggets 141a to 144a are formed by spot welding beforehand at the welding points 141 to 144, respectively. Here, with an aluminum alloy sheet or the like that is highly conductive, it is difficult to obtain sufficient joint strength by spot welding, so a special apparatus is necessary to obtain sufficient joint strength. On the other hand, with tack welding, great joint strength is not required. Therefore, a general (e.g., a steel sheet) spot welding apparatus is able to be used as it is for tack welding an aluminum alloy sheet or the like that is highly conductive. Using spot welding enables tack welding to be performed faster than with laser welding, so productivity improves.

As shown in the plan view in FIG. 10, when welding the metal sheets 131 and 132, the scanning portion 111 moves in the welding direction indicated by the arrow. Here, the welding direction is the direction in which the metal sheets 131 and 132 are welded. In other words, the welding direction is the direction in which the welding points 141 and 142 shown in FIG. 10 are formed, and is the x-axis plus direction in the example in the drawing. The scanning portion 111 may move at a constant speed (i.e., continuously) in the welding direction, or may move in a stepped manner (i.e., non-continuously).

As shown in FIG. 9, when welding the metal sheets 131 and 132, the scanning portion 111 emits the laser beam 116 at the welding point 141 where the tack weld nugget 141a is formed. Therefore, the final weld nuggets 141b are formed at the welding point 141. Then, the scanning portion 111 emits the laser beam 116 at the next welding point 142 while moving. As a result, final weld nuggets, not shown, are formed at the welding point 142. Final weld nuggets are also formed at the welding points 143 and 144 in a similar manner.

In this way, the laser welding apparatus 101 is able to weld a predetermined location of the metal sheets 131 and 132 by providing the laser beam 116 with the scanning portion 111 while moving the scanning portion 111 with the drive source 112. When the welding method described above is used, the welding points 141 to 144 are discrete. Naturally, the number of the plurality of metal sheets that are the welding objects may also be three or more.

Next, the welding method according to this example embodiment will be described with reference to FIG. 11. FIG. 11 is a view illustrating the welding method according to the third example embodiment, and is a plan view of the welding point 141. The welding method according to this example embodiment is a laser welding method that welds the plurality of metal sheets 131 and 132 together by emitting the laser beam 116 provided by the scanning portion 111 onto the plurality of metal sheets 131 and 132 that are the welding objects, while moving the scanning portion 111 that provides the laser beam 116 led from the laser oscillator 110.

Figure 11A:
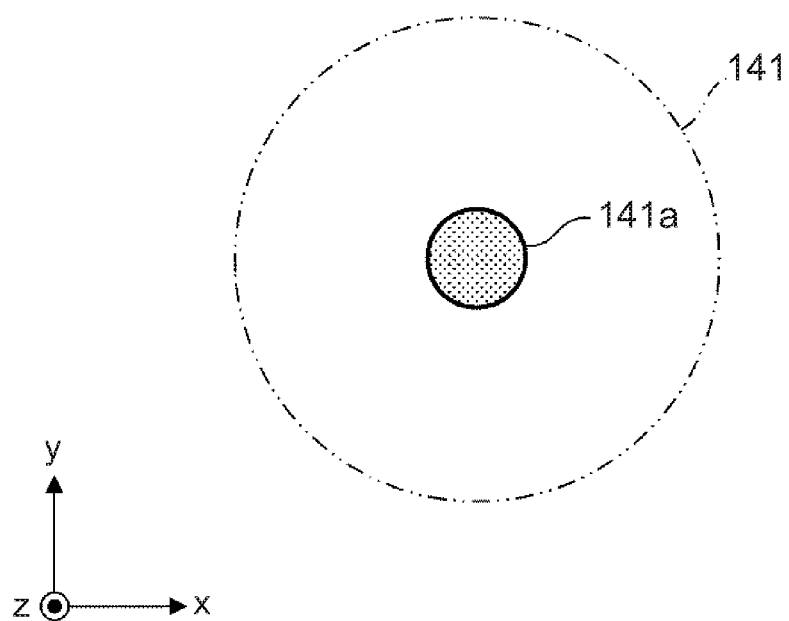
FIG. 11A is a plan view illustrating the welding method according to the third example embodiment.

Here, the metal sheets 131 and 132 are tack welded by spot welding before final welding is performed by laser welding. More specifically, the tack weld nugget 141a is formed by spot welding at the welding point 141, as shown in FIG. 11A. Here, tack welding is a temporary weld for inhibiting the metal sheets 131 and 132 from deforming due to residual stress and thermal deformation during final welding. The tack weld has less joint strength than the final weld.

Figure 11B:
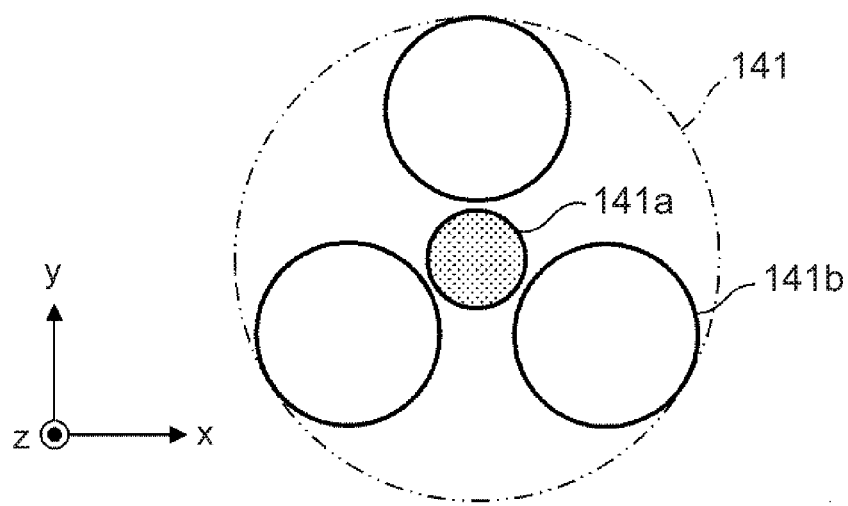
FIG. 11B is a view illustrating the welding method according to the third example embodiment.

Next, final welding is performed at the welding point 141 by emitting the laser beam 116 while leaving the tack weld nugget 141a, as shown in FIG. 11B. More specifically, a plurality of the final weld nuggets 141b are formed along a virtual closed curve that encircles the tack weld nugget 141a. In the example in the drawing, three final weld nuggets 141b are formed along the virtual closed curve (i.e., the alternate long and two short dashes line indicating the welding point 141) that encircles the welding point 141. Here, final welding is welding to strongly join the metal sheets 131 and 132 together. The order in which the plurality of final weld nuggets 141b are formed may be any order.

Figure 12:
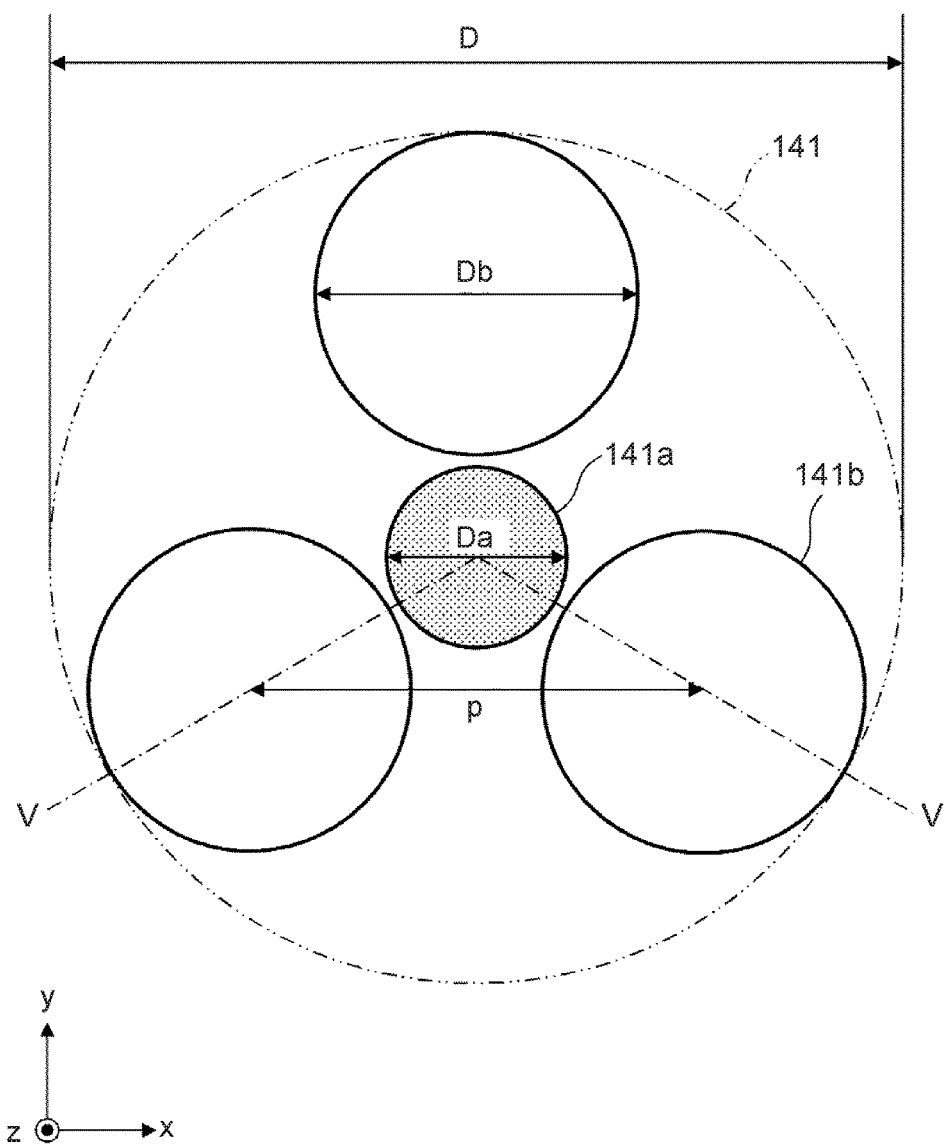
FIG. 12 is an enlarged plan view of a welding point.
Figure 13:
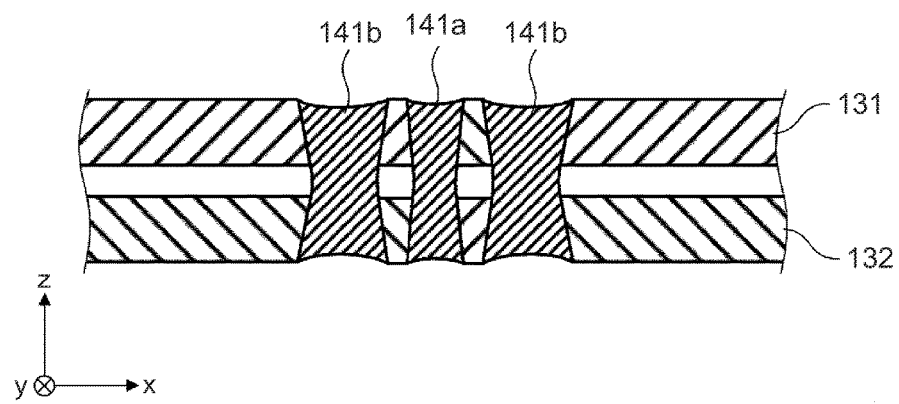
FIG. 13 is a sectional view taken along line V-V in FIG. 12.

Here, the specific structure of the welding point 141 including the tack weld nugget 141a and the plurality of final weld nuggets 141b will be described with reference to FIGS. 12 and 13. FIG. 12 is an enlarged plan view of the welding point 141, and FIG. 13 is a sectional view taken along line V-V in FIG. 12.

As shown in FIG. 12, with the welding method according to this example embodiment, the plurality of final weld nuggets 141b are formed by laser welding along the virtual closed curve (i.e., the alternate long and two short dashes line indicating the welding point 141) that encircles the tack weld nugget 141a. Therefore, the tack weld nugget 141a is surrounded by the final weld nuggets 141b, so peeling of the tack weld nugget 141a after final welding is able to be inhibited. Also, because the tack weld nugget 141a is left, the deformation inhibiting effect by the tack weld nugget 141a is able to be maintained during final welding as well.

In the example shown in FIG. 12, one circular tack weld nugget 141a having the diameter Da is formed in the center of the circular virtual curve (i.e., the alternate long and two short dashes line indicating the welding point 141) having the diameter D. Three circular final weld nuggets 141b each having a diameter Db that are inscribed in the virtual curve (i.e., the alternate long and two short dashes line indicating the welding point 141) are formed at equally-spaced intervals surrounding this tack weld nugget 141a.

From the viewpoint of the deformation inhibiting effect during final welding, the tack weld nugget 141a is preferably formed away from the final weld nuggets 141b, as shown in FIG. 12. However, a portion of the tack weld nugget 141a and a portion of the final weld nuggets 141b may also overlap with each other.

Also, the number of tack weld nuggets 141 a and the number of final weld nuggets 141b are any number. Further, the shapes of the tack weld nugget 141a and the final weld nuggets 141b are not limited to being circular, and may also be elliptical or polygonal, for example. Moreover, the virtual closed curve that encircles the tack weld nugget 141a is not limited to being circular, and may also be ellipsoidal or a suitable curve or polygonal. Also, in the example shown in FIG. 12, the virtual closed curve that encircles the tack weld nugget 141a circumscribes the final weld nuggets 141b, but it may also pass through the center of the final weld nuggets 141b, or be inscribed in the final weld nuggets 141b.

As shown in FIG. 12, the size (e.g., diameter) Da of the tack weld nugget 141a is preferably smaller than the size (e.g., diameter) Db of each of the final weld nuggets 141b. This enables thermal deformation when forming the tack weld nugget 141a to be lessened. Also, a smaller size Da of the tack weld nugget 141a enables the tack welding time to be shortened, which improves production efficiency and energy efficiency. However, the deformation inhibiting effect at the time of final welding does decrease.

In view of strength characteristics such as peeling strength, it is preferable to have the size Db of the final weld nuggets 141b with respect to the distance between adjacent final weld nuggets 141b, i.e., the pitch p, be so as to satisfy $1/2 < Db/p \le 1$. The size Db of the final weld nuggets 141b is the diameter when the final weld nuggets 141*b* have a circular shape. On the other hand, when the final weld nuggets 141*b* have an elliptical shape, the size Db may be the major axis length or it may be an average value of the major axis length and the minor axis length, for example.

When Db/p≤1/2, the size Db of the final weld nuggets 141*b* with respect to the pitch p is small, so the final weld nuggets 141*b* are separated from each other. Therefore, the plurality of final weld nuggets 141*b* do not affect each other in terms of their strength characteristic, so when a load exceeding the strength of a single final weld nugget 141*b* is applied, the final weld nugget 141*b* will fracture individually. Therefore, the strength characteristic of each final weld nugget 141*b* is less than the strength characteristic of a single nugget that is surrounded by a virtual curve (i.e., the welding point 141) having the diameter D.

Also, when 1<Db/p, the size Db of the final weld nuggets 141*b* is too large for the pitch p, and adjacent final weld nuggets 141*b*, which have the size Db, overlap with each other. Therefore, the plurality of final weld nuggets 141*b* become a single nugget and fracture all at once along the boundary between the molten portion and the base material. That is, when 1<Db/p, the strength characteristic will be equivalent to a strength characteristic of a single nugget that is surrounded by the virtual curve (i.e., the welding point 141) having the diameter D.

On the other hand, when 1/2<Db/p≤1, adjacent final weld nuggets 141*b* are suitably separated from each other. That is, base material (i.e., the metal sheets 131 and 132) is in between adjacent final weld nuggets 141*b*, so the final weld nuggets 141*b* are inhibited from becoming a single nugget and fracturing. In addition, the final weld nuggets 141*b* are also inhibited from fracturing individually. Therefore, when 1/2<Db/p≤1, a strength characteristic exceeding a strength characteristic of a single nugget that is surrounded by a virtual curve (i.e., the welding point 141) having the diameter D is able to be obtained.

Just as described above, in this example embodiment, the tack weld nugget is first formed by spot welding at the welding point, and then the plurality of final weld nuggets are formed by emitting a high-energy beam along the virtual closed curve that encircles the tack weld nugget, while leaving the tack weld nugget. Therefore, the tack weld nugget that is left after final welding is surrounded by the final weld nuggets. Thus, peeling of the tack weld nugget after final welding is able to be inhibited.

Figure 14:
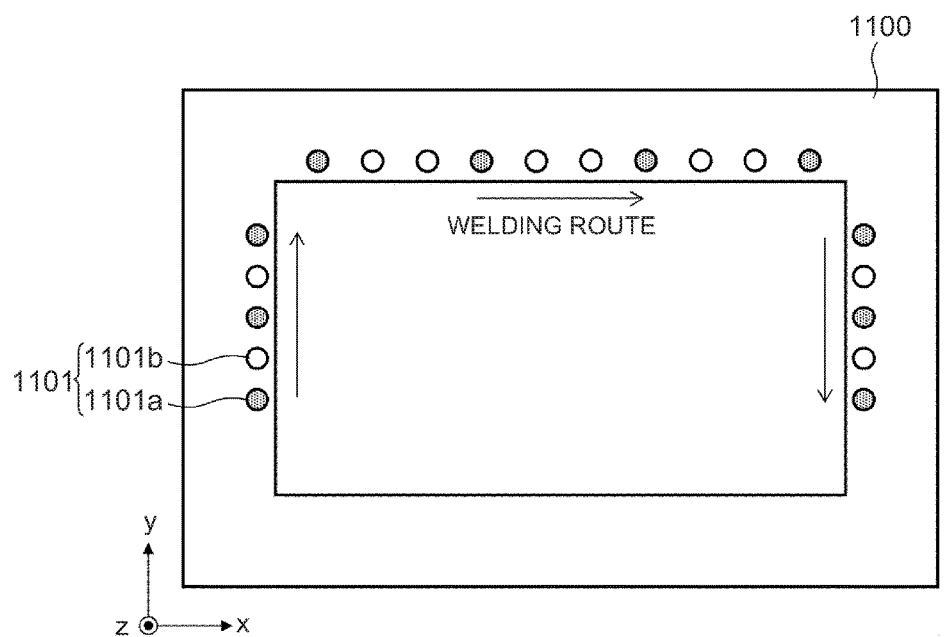
FIG. 14 is a plan view of a welding object according to the third example embodiment.
Figure 15:
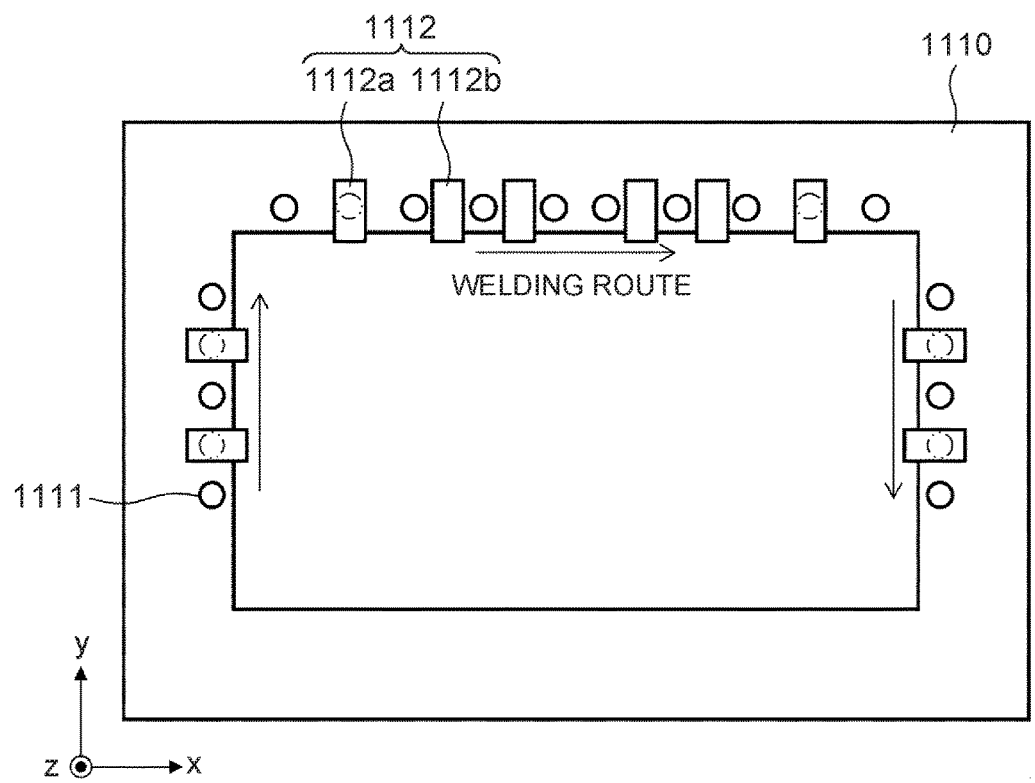
FIG. 15 is a plan view of a welding object according to a comparative example.

Next, an example of the invention will be described with reference to FIGS. 14 and 15 will be described. FIG. 14 is a plan view of a welding object 1100 according to this example, and FIG. 15 is a plan view of a welding object 1110 according to a comparative example. The welding object 1100 is welded using the welding method according to the third example embodiment. In this example, the welding object 1100 was made up of two overlapping frame-shaped 6000 series aluminum alloy sheets. The thickness of one aluminum alloy sheet was 1.2 mm and the thickness of the other aluminum alloy sheet was 0.9 mm. A copper alloy tip was used to spot weld. The welding conditions were a pressure of 1960 N, a weld current of 14 kA, and an energizing time of eight cycles. A fiber laser was used for the laser oscillator 110 of the laser welding apparatus 101.

As shown in FIG. 14, there were 20 welding points 1101 on the welding object 1100 according to the example. One circular tack weld nugget was formed by spot welding and three circular final weld nuggets were formed by laser welding, as shown enlarged in FIG. 12, at each of 10 of the welding points 1101 shown by hatching. At each of the other 10 welding points 1101*b*, only three final weld nuggets were formed; no tack weld nuggets were formed. The diameter Da of the tack weld nugget was approximately 1 to 3 mm. Also, the diameter Db of the final weld nuggets was approximately 4 mm. The diameter D of the circumscribed circle of the final weld nuggets was approximately 11 mm.

On the other hand, as shown in FIG. 15, there were also 20 welding points 1111 on the welding object 1110 according to the comparative example. At each of these welding points 1111, three final weld nuggets were formed, just as in the example, but no tack weld nuggets were formed by spot welding. Instead of tack welding, the welding object 1110 was restrained using 10 clamps 1112. Of these, four of the clamps 1112*b* are able to be provided in positions other than the welding points 1111, but six of the clamps 1112*a* need to be provided at the welding points 1111. Therefore, in the comparative example, the welding object 1110 was laser welded twice along the welding route indicated by the arrows in the drawing. The first time, 14 of the welding points 1111 were laser welded. The second time, the six welding points 1111 that were hidden by the clamps 1112*a* were laser welded.

In contrast, with the example, tacking was performed by spot welding, so the welding object 1100 was able to be welded by laser welding once along the welding route. Therefore, in the example, the production efficiency was able to be improved more than in the comparative example using the clamps. Also, in the example, three of the final weld nuggets 41*b* were formed surrounding a single tack weld nugget, as shown in FIG. 12, at each welding point 1101. Therefore, in the example, peeling of the tack weld nugget after final welding was able to be inhibited, while inhibiting deformation during final welding.

Other Example Embodiments

The invention is not limited to the foregoing example embodiments. That is, appropriate modifications may be made within the scope of the invention. For example, the shape of the nuggets at the final welding points is any shape, i.e., the nuggets may be any appropriate shape, such as C-shaped, O-shaped, or linear, for example. Also, the welding method according to the invention may be broadly applied to welding that uses a high-energy beam such as a laser beam, an electron beam, or an ion beam (e.g., hybrid laser arc welding or electron beam welding). Also, the welding method according to the invention is particularly suited to aluminum alloy sheet that tend to deform during welding, but it may also be applied to other metal sheet such as steel sheet.

What is claimed is:

1. A welding method in which welding is performed by emitting a high-energy beam onto a welding object that includes a plurality of overlapped metal sheets, comprising:
   forming a tack weld nugget at a welding point on the welding object; and
   forming a plurality of final weld nuggets along a virtual closed curve that encircles the tack weld nugget, while leaving the tack weld nugget, at the welding point.

2. The welding method according to claim 1, wherein
   the tack weld nugget is formed at the welding point on the welding object by spot welding; and
   the plurality of final weld nuggets are formed by emitting the high-energy beam along the virtual closed curve that encircles the tack weld nugget, while leaving the tack weld nugget, at the welding point.

3. The welding method according to claim 1, wherein
a size of the tack weld nugget is made smaller than a size of each of the plurality of final weld nuggets.

4. The welding method according to claim 1, wherein
a size of the tack weld nugget is made smaller than a size of one of the final weld nuggets.

5. The welding method according to claim 1, wherein
the tack weld nugget and the plurality of final weld nuggets are formed separated from each other.

6. The welding method according to claim 1, wherein
a laser beam is used as the high-energy beam.

7. The welding method according to claim 1, wherein
the virtual closed curve corresponds to a circumscribed circle of the final weld nuggets.

8. The welding method according to claim 1, wherein
the virtual closed curve corresponds to the welding point.

9. The welding method according to claim 3, wherein
the tack weld nugget and the final weld nugget have circular shapes; and
the size of the tack weld nugget is a diameter of the tack weld nugget, and the size of the final weld nugget is a diameter of the final weld nugget.

10. The welding method according to claim 4, wherein
the tack weld nugget and the final weld nugget have a circular shape; and
the size of the tack weld nugget is a diameter of the tack weld nugget, and the size of the final weld nugget is a diameter of the final weld nugget.

11. The welding method according to claim 3, wherein
the tack weld nugget and the final weld nugget have an elliptical shape; and
the size of the tack weld nugget is a major axis length of the tack weld nugget, and the size of the final weld nugget is a major axis length of the final weld nugget.

12. The welding method according to claim 4, wherein
the tack weld nugget and the final weld nugget have an elliptical shape; and
the size of the tack weld nugget is a major axis length of the tack weld nugget, and the size of the final weld nugget is a major axis length of the final weld nugget.

13. The welding method according to claim 3, wherein
the tack weld nugget and the final weld nugget have an elliptical shape; and
the size of the tack weld nugget is an average value of a major axis length of the tack weld nugget and a minor axis length of the tack weld nugget, and the size of the final weld nugget is an average value of a major axis length of the final weld nugget and a minor axis length of the final weld nugget.

14. The welding method according to claim 4, wherein
the tack weld nugget and the final weld nugget have an elliptical shape; and
the size of the tack weld nugget is an average value of a major axis length of the tack weld nugget and a minor axis length of the tack weld nugget, and the size of the final weld nugget is an average value of a major axis length of the final weld nugget and a minor axis length of the final weld nugget.

* * * * *